(12) United States Patent
Joye et al.

(10) Patent No.: US 8,233,614 B2
(45) Date of Patent: Jul. 31, 2012

(54) INTEGER DIVISION METHOD SECURE AGAINST COVERT CHANNEL ATTACKS

(75) Inventors: Marc Joye, Saint Zacharie (FR); Karine Villegas, Gemenos (FR)

(73) Assignee: Gemalto SA, Meudon (FR)

( * ) Notice: Subject to any disclaimer, the term of this patent is extended or adjusted under 35 U.S.C. 154(b) by 1823 days.

(21) Appl. No.: 10/534,873

(22) PCT Filed: Nov. 13, 2003

(86) PCT No.: PCT/FR03/50119
§ 371 (c)(1),
(2), (4) Date: Nov. 20, 2005

(87) PCT Pub. No.: WO2004/046017
PCT Pub. Date: Jun. 3, 2004

(65) Prior Publication Data
US 2006/0133603 A1     Jun. 22, 2006

(30) Foreign Application Priority Data

Nov. 15, 2002   (FR) .................................... 02 14281

(51) Int. Cl.
*H04K 1/00* (2006.01)
*H04L 9/00* (2006.01)
*H04L 9/28* (2006.01)

(52) U.S. Cl. .............. 380/28; 380/29; 380/30; 380/37; 713/193; 713/194; 708/492; 708/504; 708/650

(58) Field of Classification Search ............. 380/30
See application file for complete search history.

(56) References Cited

U.S. PATENT DOCUMENTS

| 4,514,592 | A  | * | 4/1985 | Miyaguchi .................. 380/30 |
| 2003/0061498 | A1 | * | 3/2003 | Drexler et al. ............ 713/189 |
| 2004/0184604 | A1 | * | 9/2004 | Joye et al. .................... 380/30 |

OTHER PUBLICATIONS

Menezes et al., "Handbook of applied cryptography", 1996, p. 593 and pp. 598-629, CRC PRESS.
Walter C D, "Montgomery's Multiplication Technique: How to make it smaller and Faster", Cryptographic Hardware and Embedded Systems. International Workshop, Aug. 1999, pp. 80-93.

* cited by examiner

*Primary Examiner* — Nathan Flynn
*Assistant Examiner* — Bryan Wright
(74) *Attorney, Agent, or Firm* — Buchanan, Ingersoll & Rooney, PC

(57) ABSTRACT

The invention relates to a cryptographic method involving an integer division of type q=a div b and r=a mod b, wherein a is a number of m bits, b is a number of n bits, with n being less than or equal to m, and $b_{n-1}$ being non-null and the most significant bit of b. In addition, each iteration of a loop subscripted by i, which varies between 1 and m−n+1, involves a partial division of a word A of n bits of number a by number b in order to obtain one bit of quotient q. According to the invention, the same operations are performed with each iteration, regardless of the value of the quotient bit obtained. In different embodiments of the invention, one of the following is also performed with each iteration: the addition and subtraction of number b to/from word A; the addition of number b or a complementary number /b of b to word A; or a complement operation at $2^n$ of an updated datum (b or /b) or a dummy datum (c or /c) followed by the addition of the datum updated with word A.

9 Claims, 1 Drawing Sheet

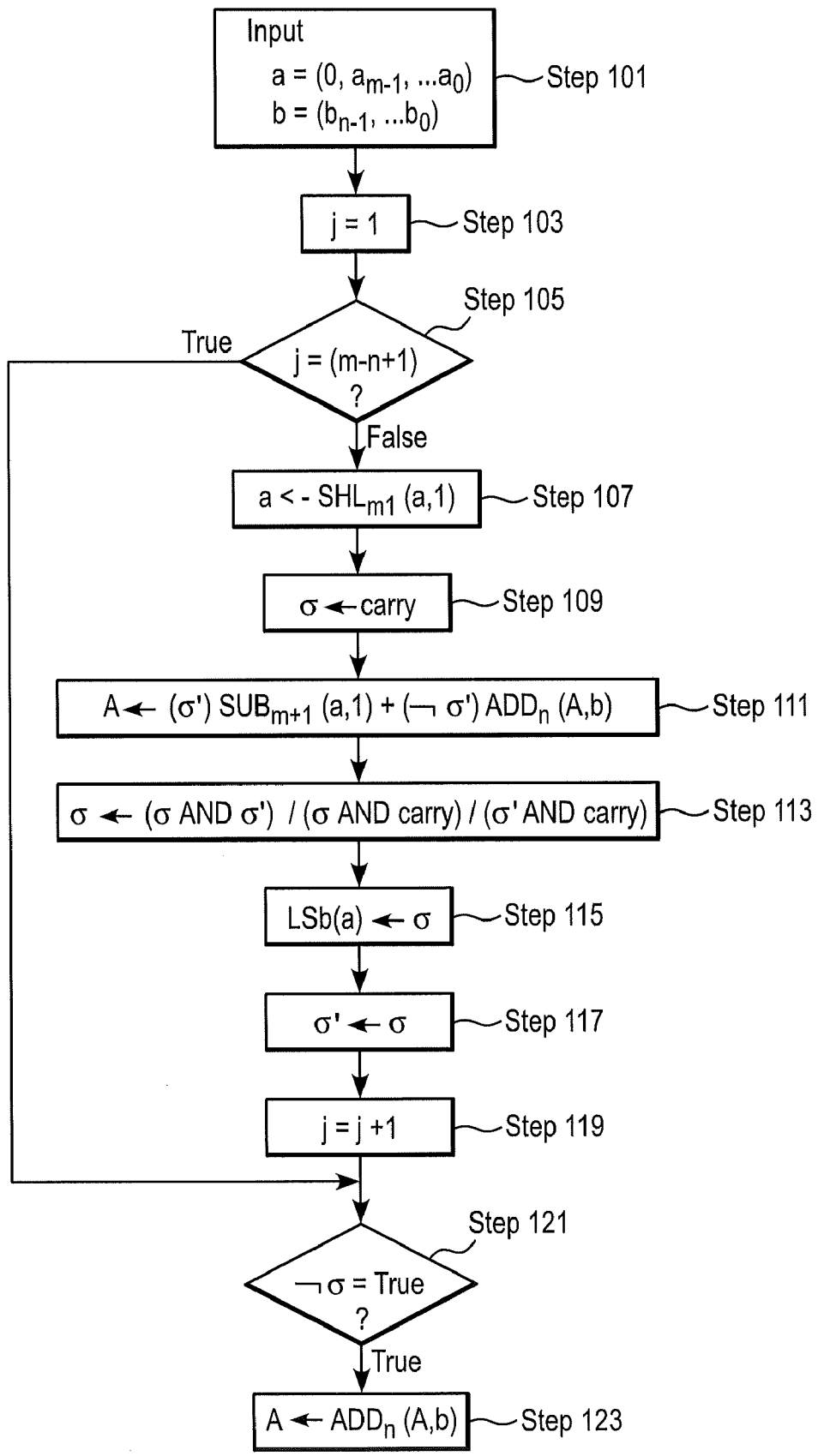

INTEGER DIVISION METHOD SECURE AGAINST COVERT CHANNEL ATTACKS

This disclosure is based upon French Application No. 02/14281, filed Nov. 15, 2002, and International Application No. PCT/FR2003/050119, filed Nov. 13, 2003, the contents of which are incorporated herein by reference.

The invention concerns an integer division method secure against attacks of the covert channel type. The invention is in particular advantageous for performing division operation in a more general cryptographic method, for example a secret or public key cryptographic method. Such a cryptographic method can for example be implemented in electronic devices such as chip cards.

The security of cryptographic methods lies in their ability to keep concealed the confidential data or data derived from confidential data that they manipulate.

A malevolent user may possibly undertake attacks aimed as discovering in particular confidential data contained and manipulated in processing operations performed by the calculation device executing a cryptographic method.

Amongst the best known attacks, simple or differential covert channel attacks can be cited. Covert channel attack means an attack based on a physical quality measurable from outside the device and whose direct analysis (simple attack) or analysis according to a statistical method (differential attack) makes it possible to discover data contained and manipulated in processing operations performed in the device. These attacks have in particular been disclosed by Paul Kocher (Advances in Cryptology—CRYPTO '99, vol. 1666 of Lecture Notes in Computer Science, pp. 388-397. Springer-Verlag, 1999).

Amongst the physical quantities which can be exploited for these purposes, the execution time, the current consumption, the electromagnetic field radiated by the part of component used for executing the calculation, etc, can be cited. These attacks are based on the fact that, during the execution of a method, the manipulation of a bit, that is to say its processing by a particular instruction, leaves a particular imprint on the physical quantity in question, according to the value of this bit and/or according to the instruction.

The cryptographic methods using as a basic operation a modular exponentiation operation of type $Y=X^D$, X, Y and D being integer numbers, have been very widely studied during the past few years. By way of example, the RSA method, the key exchange according to Diffie-Hellman or the DSA signature method can be cited. Significant progress has been made in protecting these methods against covert channel attacks.

On the other hand, no study has been made on making secure cryptographic methods using as an elementary operation an integer division of the type q=a div b and r=a mod b, a and b being two operands, q and r being respectively the quotient and the remainder of the integer division of a by b. a and/or b are secret data, for example elements of a key of the method. For example, the method of Barrett (P. Barret, "Implementing the RSA public key encryption algorithm on a standard digital signal processing", vol 263 of Lecture Notes in Computer Science, pp. 311-323, Springer Verlag, 1987), the method of Quisquater (U.S. Pat. No. 5,166,978, November 92) or the RSA method implemented according to the Chinese remainder theorem (J J Quisquater and C Couvreur, "Fast decipherment algorithm for RSA public key cryptosystem", Electronics Letter, vol 18, 99. 905-907, October 1982) are cryptographic methods using an integer division as an elementary operation.

A known method for implementing an integer division is the so called "paper/pencil" method. This method in practice repeats the method used when such an operation is performed by hand. This method is set out below.

Given two data items $a=(a_{m-1}, \ldots, a_0)$ of m bits and $b=(b_{n-1}, \ldots, b_0)$ of n bits, n less than or equal to m and $b_{n-1} \gamma 0$, the so called "paper/pencil" division method calculates the quotient q=a div b and the remainder r=a div b. For this purpose, the method successively performs several division of an integer A of n+1 bits by the integer b of n bits. It is necessary in practice to have 0 [A/b<2, which is the case whenever $b_{n-1} \gamma 0$.

The remainder r is a number of no more than n bits since r<b. The quotient q for its part is a number of no more than m−n+1 bits since q=a div b [a div $(b_{n-1}*2^{n-1})$=a div $2^{n-1}$= $(a_{m-1}, \ldots, a_{n-1})$ since b μ $b_{n-1}*2^{n-1}$ and $(a_{m-1}, \ldots, a_{n-1})$ is a number of m−n+1 bits. At the end of the division method, the quotient q is stored in the m−n+1 least significant bits of the register containing initially the number a. The most significant bit of the remainder r is stored in a 1-bit register used as a carry during the calculation and the n−1 least significant bits of the remainder r are stored in the n−1 most significant bits of the register initially containing the number a.

As this work is carried out in base 2, the quotient bit of the integer division A div b has only two possible values: 0 or 1. Thus a simple way of performing the operation A div b consists of subtracting b from A and then testing the result: if the result of A−b is positive, then A div b=1, if the result of A−b is strictly negative, then A div b=0.

The complete division method can then be written in the following manner:

```
Input:      a = (0, a_{m-1}, ..., a_0)
            b = (b_{n-1}, ..., b_0)
Output :    q = a div b and r = a mod b
A = (0, a_{m-1}, ..., a_{m-n+1})
For j = 1 to (m-n+1) , do:
    a <- SHL_{m+1} (a, 1) ; σ <- carry
    A <- SUB_n (A, b) ; σ <- σ OR carry
    if (¬σ = TRUE) then A <- ADD_n (A, b)
        if not lsb(a) = 1
End For
```

Method 1

In this method, and throughout the following, the following notations are used.

The symbol "←" and the notation y←x are used to indicate the loading of the content of a register containing a data item x in a register whose content is called y.

A is an n-bit word corresponding to the content of the n most significant bits of the register initially containing the data item a. A is of course modified at each iteration.

σ indicates whether or not the subtraction has been performed wrongly (i.e. whether the quotient bit must be equal to 0 or to 1).

¬σ is the complement to 1 (also referred to as negation) of the variable σ. TRUE is a constant, equal to 1 in one example.

lsb(a) is the lowest weight bit of the number a, also referred to as the least significant bit of a.

$SHL_{m+1}(a, 1)$ is an operation of shifting to the left by 1 bit in the register of m+1 bits containing the data item a, the bit leaving the register being stored in the variable carry and a bit equal to 0 being entered as the least significant bit of the register initially containing the data a.

$ADD_n(A, b)$ is an operation of addition of the n bits of the number b to the n bits of the word A. It will be noted that the operation $SHL_n(a, 1)$ is equivalent to the operation $ADD_n(a, a)$. Naturally the addition $ADD_n(a, b)$ is performed by adding, in an appropriate register content addition circuit, the content of the two registers containing respectively A and b.

$SUB_n(A, b)$ is an operation of subtraction of the number b from the word A. Naturally the subtraction $SUB_n(A, b)$ is performed by subtracting, in an appropriate circuit, the content of a register containing the data item b from the content of the register containing the word A.

Finally, wrongly speaking but in particular for reasons of clarity, the same name will be used to speak of a register and its content. Thus the register A is in fact the register containing the data item A.

In summary, the method 1 performs the following steps:
- if $a \leftarrow SHL_{m+1}(a, 1)$ generates a carry ($\sigma$=carry=1), this means that $a_m$=1 (before shifting) and therefore that b must be subtracted from A.
- if $a_{m+1}$=0 (before shifting) and if $A \leftarrow SUB_n(A, b)$ generates a carry (carry=1), this means that A−b μ 0 before subtraction and therefore b must be subtracted from A.
- if $a \leftarrow SHL_{m+1}(a, 1)$ does not generate a carry and if $A \leftarrow SUB_n(A, b)$ also does not generate a carry (that is to say if, after updating σ, σ is false (or ¬σ is TRUE, then this means that A−b<0 before subtraction and therefore that b would not have to be subtracted from A. In this case, the method performs an addition operation $A \leftarrow ADD_n(A, b)$ in order to restore the value of A.

The method 1 is sensitive to covert channel attacks. This is because it is noted with method 1 that, at each iteration, according to the value of σ, that is to say according to the value of the quotient bit which will be obtained during the current iteration, an addition $ADD_n(A, b)$ is performed or not. The number of operations performed during an iteration therefore varies according to the result bit obtained during the said iteration. However, the current consumption during each iteration and/or the duration of each iteration varies according to the number of operations performed. By measuring and studying for example the trace left by the component when the method is executed, it is then possible to determine bit by bit the value of the result bits.

Another method also known for performing integer divisions is a variant of the "paper/pencil" method, referred to as a "non-restoring" (Non-Restoring Binary Division Algorithm, in particular described in "J. J. F. Cavanagh, Digital Computer Arithmetic, McGraw-Hill Company, 1984".

```
Input:          a = (0, a_{m-1}, ..., a_0)
                b - (b_{n-1}, ..., b_0)
Output :        q = a div b and r = a mod b
σ' <- 1 ; A = (0, a_{m-1}, ..., a_{m-n+1})
for j = 1 to (m-n+1) , do:
    a <- SHL_{m+1} (a, 1) ; σ <- carry
    if (σ' = TRUE) then A <- SUB_n (A, b)
                    σ <- σ OR carry
                if not A <- ADD_n (A, b)
                    σ <- σ AND carry
    if (¬σ = TRUE) then lsb(a) = 1
    σ' <- σ
End For
if (¬σ) = (TRUE) then A <- ADD_n (A, b)
```

Method 2

Compared with method 1, the method uses a new variable σ' to preserve of the value of σ obtained at the previous iteration. Here, according to the value σ, an addition or subtraction is performed. In other words, if during an iteration b is wrongly subtracted from A, then the value of A is restored during the following iteration rather than at the end of the current iteration as in the case of method 1.

Whatever the value of a during an iteration, the method performs the same number of operations during each iteration. This precaution is however not sufficient to protect the method against covert channel attacks. This is because, at each iteration, a shift operation $a \leftarrow SHL_{m+1}(a, 1)$ is performed and then, depending on the value of σ, an addition $A \leftarrow ADD_n(A, b)$ or a subtraction $A \leftarrow SUB_n(A, b)$.

However, the performance of a subtraction takes longer and consumes more energy than the performance of an additional operation. This is because, usually, the calculations means used for implementing the method do not include a subtraction circuit. The subtraction operation is performed by first of all calculating the complement to $2^n$ of b, denoted $\overline{b}$, then adding $\overline{b}$ to A, any carry of the addition being stored in the variable carry. This method of performing a subtraction is justified by the fact that, by definition of $\overline{b}$, $b+\overline{b}=2^n$. This therefore gives $A-b=A+\overline{b}-2^n=A+\overline{b}$ mod $(2^n)$, mod $(2^n)$ being a reduction modulo $2^n$. Two operations, an operation of complement to $2^n$ and an addition, are therefore in practice necessary for performing a subtraction.

As the known integer division methods are not protected against covert channel attacks, any cryptographic method using the known integer division methods are therefore no longer protected against such covert channel attacks.

In addition, statistically, 50% of the bits of the quotient obtained by a division method are equal to 0, which means that statistically the method compensates for one subtraction out of two made wrongly. The execution time of method 1 is therefore statistically at one point five times longer than the execution time of method 2.

OBJECTS OF THE INVENTION

In the light of the problems of current cryptographic methods, an essential object of the invention is a novel method of performing an integer division, protected against covert channel attacks.

A supplementary object of the invention is a method of performing an integer division whose execution time is very short.

A supplementary object of the invention is also a method of performing an integer division during which only the register containing the initial data item a is modified, replaced by the quotient and the result, any other register of the memory (and in particular the register initially containing the data item b) remaining unchanged at the end of the execution of the method.

DESCRIPTION OF PREFERRED EMBODIMENTS

With this principal objective and these subsidiary objectives in view, the invention proposes a cryptographic method during which an integer division of the type q=a div b and r=a mod b is performed, with a a number of m bits, b a number of n bits with n less and or equal to m and $b_{n-1}$ non-zero, $b_{n-1}$ being the most significant bit of b, a method during which, at each iteration of a loop subscripted by i varying between 1 and m−n+1, a partial division is performed of a word a of n bits of the number a by the number b in order to obtain a bit of the quotient q.

According to the invention, the same operations are performed at each iteration, whatever the value of the quotient bit obtained.

BRIEF DESCRIPTION OF THE DRAWING

FIG. 1 is a flow chart of the processes according to an example of a method of integer division, in which the same operations are performed at each iteration.

Thus, with the method according to the invention, it is no longer possible to determine the bits of the result from the trace left during the execution of the method of invention.

According to a first embodiment of the method of invention, at each iteration, an operation of addition of the number b from the word A and a subtraction of the number b from the word A are performed.

According to this first embodiment, the method preferably comprises all the following steps:

```
Input:      a = (0, a_{m-1}, ..., a_0)
            b = (b_{n-1}, ..., b_0)
Output :    q = a div b and r = a mod b
σ' <- 1 ; A = (0, a_{m-1}, ..., a_{m-n+1})
For j = 1 to (m-n+1) , do:
    a <- SHL_{m+1} (a, 1) ; σ <- carry
    A <- (σ') SUB_{m+1} (a, 1) + (¬σ') ADD_n (A, b)
    σ <- (σ AND σ') / (σ AND carry) / (σ' AND carry)
    lsb (a) <- σ
    σ' <- σ
End For
if (¬σ) = (TRUE) then A <- ADD_n (A, b)
```

In this embodiment, the above variable carry designates the carry resulting from the operation $SUB_n(A, b)$ when σ' is equal to 1 and the carry resulting from the operation $ADD_n(A, b)$ when σ' is equal to 0.

The processes in the above embodiment are illustrated in steps 101-123 of the flow chart, shown in FIG. 1.

According to a second embodiment of the method according to the invention, at each iteration, an operation is performed of addition either of the number b or of a number $\overline{b}$ complementary to the number b with the word A.

Preferably, during each iteration, an updating is also performed of a first variable (σ') according to the bit of the quotient produced, the said first variable (σ') indicating whether, during the following iteration, the number b or the number $\overline{b}$ must be added to the word A.

Preferably again, according to this embodiment, the method comprises all the following steps:

```
Input:      a = (0, a_{m-1}, ..., a_0)
            b = (b_{n-1}, ..., b_0)
Output :    q = a div b and r = a mod b
A = (0, a_{m-1}, ..., a_{m-n+1}) ; σ' <- 1 ; b̄ <- CPL2n(b)
for j = 1 to (m-n+1) , do :
    a <- SHL_{m+1} (a, 1) ; σ <- carry
    d_{addr} <- b_{addr} + σ' (b̄_{addr} - b_{addr})
    A <- ADD_n (A, d)
    σ' <- (σ' AND σ') / (σ' AND carry) / (σ' AND carry)
    lsb (a) <- σ'
    σ' <- σ'
End For
if (¬σ = TRUE) then A <- ADD_n (A, b)
```

According to a third embodiment of the method according to the invention, at each iteration, an operation of complement to $2^n$ of an updated data item (b or $\overline{b}$) or of a notional data item (c or $\overline{c}$) is performed, and then an operation of addition of the updated data item with the word A.

Preferably, during each iteration, an updating of a second variable (δ) according to the bit of the quotient produced is also carried out at each iteration, the said second variable (δ) indicating whether during the following iteration the operation of complement to 2n must be performed on the updated data item or on the notional data item.

Preferably again, during each iteration, the updating of a third variable (β) is also performed indicating whether the updated data item is equal to the number b or to the complementary number $\overline{b}$.

Preferably again, according to this embodiment, the method comprises all the following steps:

```
Input:      a = (0, a_{m-1}, ..., a_0)
            b = (b_{n-1}, ..., b_0)
Output :    q = a div b and r = a mod b
σ' <- 1 ; β <- 1, γ <- 1 ; A = (0, a_{m-1}, ..., a_{m-n+1})
for j = 1 to (m-n+1) , do :
    a <- SHL_{m+1} (a, 1) ; σ <- carry
    δ' <- σ' / β
    d_{addr} <- b_{addr} + δ' (c_{addr} - b_{addr})
    d <- CPL2_n (d)
    A <- ADD_n (A, b)
    σ' <- (σ' AND σ') / (σ' AND carry) / (σ' AND carry)
    β <- ¬σ ; γ <- γ / δ' ; σ' <- σ'
    lsb (a) = σ'
end for
if (¬β = TRUE) then b <- CPL2_n (b)
if (¬γ = TRUE) then c <- CPL2_n (c)
if (¬σ = TRUE) then A <- ADD_n (A, b)
```

The invention also concerns an electronic component comprising calculation means programmed to implement a method as described above, the calculation means comprising in particular a central unit associated with a memory comprising several registers for storing the data a and b.

Finally, the invention also concerns a chip card comprising an integrated circuit as described above.

The invention will be better understood and other characteristics and advantages will emerge from a reading of the following description of example embodiments of integer division methods according to the invention.

In a first example of implementation of the invention, a method secure against covert channel attacks is implemented by eliminating the test operations (of the type if . . . then . . . otherwise . . . ) of method 2 and therefore the consequences of their presence.

According to the invention, in method 2, the steps if . . . then . . . otherwise are replaced by the following three steps:
A←σ'SUB_n (A, b)+(¬σ'(ADD_n (A, b)
σ←(σAND σ')/σAND carry)/σ' AND carry)
lsb(a) ←σ

In this way the following method according to the invention is obtained.

```
Input :     a = (0, a_{m-1}, ..., a_0)
            b = (b_{n-1}, ..., b_0)
Output:  q = a div b and r = a mod b
A = (0, a_{m-1}, ..., a_{m-n+1}) ; σ' <- 1
For  j = 1 to (m-n+1), do:
    a <- SHL_{m+1}(a, 1) ; σ <- carry
    A <- (σ')SUB_n(A, b) + (¬σ')ADD_n(A, b)
    σ <- (σ' AND σ') / (σ' AND carry)/ (σ' AND carry)
    lsb(a) <- σ'
    σ' <- σ
```

-continued

```
    End for
    if (¬σ = TRUE) then A <- ADD_n(A, b)
```

Method 3

Method 3 is equivalent to method 2 in that it produces the same result from the same input data a and b. This is because, in method 2, when σ'=1, the operation A←SUB$_n$(A, b) is performed and when σ'=0, the operation A←ADD$_n$(A, b) is performed. The same applies in method 3 since σ'=¬(¬σ'). Moreover, in method 2, when σ'=1, the operation σ←σ OR carry is performed, and when σ'=0 the operation σ←σ AND carry is performed. This can be written in the form σ←(σ') (σ OR carry)+(¬σ')(σ AND carry), which is logically equivalent to σ←(σ AND σ')/(σ AND carry)/(σ' AND carry)

Finally, in method 2, by performing the operation a←SHL$_{m+1}$(a, 1), the least significant bit of a is fixed at 0 (in other words lsb(a)=0) and then, at the end of the current iteration, if σ=1, the operation lsb(a)=1 is performed, otherwise, if σ=0, lsb(a) is not modified. It is therefore possible to easily replace the operation {if σ=1, lsb(a)+1} by the operation lsb(a)=σ, whatever the value of σ.

Method 3 is not equivalent to method 2 but is also secure vis-à-vis covert channel attacks. This is because the method contains no test operation of the type if . . . then . . . otherwise, and the same operations are performed at each iteration, whatever the bit of the input data used and/or the result bit obtained during an iteration. It is therefore impossible, from the trace left by the component, to separate the various iterations and to determine the bits of the input data and/or of the output data.

In a second example of implementation of the invention, method 3 according to the invention is modified by limiting in addition the execution time of the method.

As seen previously, in order to perform a subtraction operation A←SUB$_n$(A, b), in practice an operation $\bar{b}$=CPL2$_n$(b) of complement to $2^n$ of the number b is performed and then an addition operation of the type A←ADD$_n$(A, $\bar{b}$).

Which means, for method 3, that at each iteration an operation of complement to $2^n$ is performed, in addition to an addition operation A←ADD$_n$(A, b) or A←ADD$_n$(A, $\bar{b}$).

In order to reduce the execution time, the number of operations of complement to $2^n$ $\bar{b}$←CPL2$_n$(b) is limited, an additional memory space is used to store the value of $\bar{b}$ at the start of the method. It then suffices to add $\bar{b}$ to A in order to effect A←SUB$_n$(A, b) or to add b to A in order to effect A←ADD$_n$(A, b). This also makes it possible to perform a single addition operation by iteration, so that the execution speed is increased further.

Two registers b and $\bar{b}$ are used here in order to store respectively the data b and $\bar{b}$ and having the address b$_{addr}$ and $\bar{b}_{addr}$. The register whose content is added to the content of the register A during a given iteration is called d and its address is called d$_{addr}$. In practice, at each iteration, the register d is either the register containing b or the register containing $\bar{b}$. As in method 3, the variable σ' is used to keep a trace of what has happened during a given iteration and to determine whether an addition or a subtraction must be performed at the following iteration. By grouping together the whole, the following method 4 is finally obtained:

```
Input:        a = (0, a_{m-1}, ..., a_0)
              b = (b_{n-1}, ..., b_0)
Output :      q = a div b and r = a mod b
A = (0, a_{m-1}, ..., a_{m-n+1}) ; σ' <- 1 ; $\bar{b}$ <- CPL2_N(b)
For j = 1 to (m-n+1) , do :
    a <- SHL_{m+1} (a, 1) ; σ <- carry
    d_{addr} <- b_{addr} + σ' ($\bar{b}_{addr}$ - b_{addr})
    A <- ADD_n (A, d)
    σ <- (σ' AND σ') / (σ' AND carry) / (σ' AND carry)
    lsb (a) <- σ
    σ' <- σ
End For
if (¬σ = TRUE) then A <- ADD_n (A, b)
```

Method 4

In a third example of implementation of the invention, method 4 according to the invention is modified by limiting the memory space used for implementing the method.

For this purpose, the value of $\bar{b}$ complementary to b, the result of the operation CPL2$_n$(b), is stored in place of the initial value of b, in the same register. The subtraction operation is thus performed by replacing b with its complement $\bar{b}$ in the same register and then adding to A the content of the said register.

In addition, the calculation of unnecessary values of $\bar{b}$ is avoided (this is the case when two successive iterations j and j+1 both use the same addition, either A←A+b or A←A+$\bar{b}$). For this purpose, another register c is used whose contents, indifferent or notional, is replaced by its complement to $2^n$ when it is not necessary to replace the content of the register initially containing b (that is to say when two successive iterations use either b or $\bar{b}$. In practice, the register c is any register of the memory, with the same size as the register containing b, but different from the registers initially containing a or b. The register c can also be used for performing other operations. At the end of the method of the invention, the register c contains its initial value, that is to say that which it had before execution of the method. The initial value of the content of the register c is completely indifferent since this value is not actually used in the context of the method according to the invention.

The term d$_{addr}$ is given to the address of the register containing the value which will be replaced by its complement to $2^n$ during the current iteration: d$_{addr}$ is either b$_{addr}$ if the content of the register initially containing b must be complemented to $2^n$, or c$_{addr}$ otherwise. The term d is given to the content of the register whose address is d$_{addr}$.

Use is also made of the variables β and γ to keep a trace of the state of the value contained in the registers located at the address b$_{addr}$ and c$_{addr}$. This state is either the original value or the original value complemented to $2^n$. β=1 (or respectively γ=1) is chosen when the value located at the address b$_{addr}$ (or respectively c$_{addr}$) is the original value, and β=0 (or respectively γ=0) when the value located at the address b$_{addr}$ (or respectively c$_{addr}$) is the complement to $2^n$ of the original value. The variable σ' is used to keep a trace of the value of the variable σ at the previous iteration. As before, σ'=0 means that an unnecessary subtraction (A←SUB$_n$(A, b)=ADD$_n$(A, b)) was performed at the previous iteration and that an addition operation A←ADD$_n$(A, b) must be performed during the current iteration in order to compensate. Conversely, σ'=1 means that no subtraction was performed wrongly during the previous iteration and that a subtraction must be performed during the current iteration.

The following truth table is obtained

| Previous values | | | Updated values | |
|---|---|---|---|---|
| σ' | β | γ | β | γ |
| 0 | 0 | 0 | 1 | 0 |
| 0 | 0 | 1 | 1 | 1 |
| 0 | 1 | 0 | 1 | 1 |
| 0 | 1 | 1 | 1 | 0 |
| 1 | 0 | 0 | 0 | 1 |
| 1 | 0 | 1 | 0 | 0 |
| 1 | 1 | 0 | 0 | 0 |
| 1 | 1 | 1 | 0 | 1 |

The following are derived from this:
$\beta \leftarrow \neg \sigma'$
$\gamma \leftarrow \gamma / \sigma' / \beta$ By grouping together the whole, the following method 5 is finally obtained:

```
Input:          a = (0, a_{m-1}, ..., a_0)
                b = (b_{n-1}, ..., b_0)
Output :        q = a div b and r = a mod b
σ' <- 1 ; β <- 1, γ <- 1 ; A = (0, a_{m-1}, ..., a_{m-n+1})
for j = 1 to (m-n+1) , do :
    a <- SHL_{m+1} (a, 1) ; σ <- carry
    δ <- σ' / β
    d_{addr} <- b_{addr} + δ (c_{addr} - b_{addr})
    d <- CPL2_n (d)
    A <- ADD_n (A, b)
    σ <- (σ AND σ') / (σ AND carry) / (σ' AND carry)
    β <- ¬σ' ; γ <- γ / δ; σ' <- σ
    lsb (a) = σ
    σ' <- σ
end for
if (¬β = TRUE) then b <- CPL2_n (b)
if (¬γ = TRUE) then c <- CPL2_n (c)
if (¬σ = TRUE) then A <- ADD_n (A, b)
```

Method 5

In general terms, the essential advantage of the invention compared with the other known methods performing the same operation is that it is secure vis-à-vis covert channel attacks, and in particular attacks of the SPA type. In addition, in order to be implemented, the method according to the invention requires no more resources (in particular in terms of execution time and memory space) than the known unprotected integer division methods.

The invention claimed is:

1. A cryptographic method during which an integer division of the type q=a div b and r=a mod b is performed in a processor of an electronic device, where q is a quotient, a is a number containing m bits, b is a number containing n bits, with n less than or equal to m and $b_{n-1}$ is non-zero, $b_{n-1}$ being the most significant bit of b, comprising the following steps:
   (i) performing a partial division of a word A, comprising n bits of the number a, by the number b to obtain a bit of the quotient q, wherein at least one of the numbers a and b comprises secret data;
   (ii) repeating step (i) for m−n+1 iterations with the same number and type of operations being performed at each iteration, regardless of the value of the quotient bit obtained, to obtain the quotient q; and
   (iii) generating encrypted or decrypted data in accordance with said quotient.

2. A method according to claim 1, wherein, at each iteration, an addition of the number b to the word A and a subtraction of the number b from the word A are performed.

3. A method according to claim 1 wherein, at each iteration, either the number b or a number $\overline{b}$ complementary to the number b is added to the word A.

4. A method according to claim 3, further including the step, at each iteration, of updating a first variable (σ') indicating whether, during the following iteration, the number b or the number $\overline{b}$ is to be added with the word A according to the quotient bit produced.

5. A method according to claim 1, further including the steps, at each iteration, of performing an operation of complement to $2^n$ of an updated data item (b or $\overline{b}$) or of a notional data item (c or $\overline{c}$), and adding the updated data item with the word A.

6. A method according to claim 5, further including the step, at each iteration, of updating a second variable (δ), indicating whether, during the following iteration, the operation of complement to $2^n$ is to be performed on the updated data item or on the notional data item.

7. A method according to claim 5, further including the step, at each iteration, of updating a third variable (β) indicating whether the updated data item is equal to the data item b or to its complement to $2^n$.

8. An electronic component comprising calculation means programmed to implement a method according to claim 1, said calculation means comprising a central unit associated with a memory comprising several registers for storing the data a and b.

9. A chip card comprising an electronic component according to claim 8.

* * * * *